United States Patent Office 3,636,089
Patented Jan. 18, 1972

3,636,089
PRODUCTION OF AROMATIC DITHIOCARBOXYLIC ACIDS
Friedrich Becke, Heidelberg, and Helmuth Hagen, Ludwigshafen (Rhine), Germany, assignors to Badische Anilin- & Soda-Fabrik Aktiengesellschaft, Ludwigshafen (Rhine), Germany
No Drawing. Filed June 3, 1968, Ser. No. 733,773
Claims priority, application Germany, June 16, 1967,
P 12 74 121.8–42
Int. Cl. C07c *153/00*
U.S. Cl. 260—502.6     4 Claims

ABSTRACT OF THE DISCLOSURE

The production of aromatic dithiocarboxylic acids by reaction of aromatic monohalomethyl compounds with elementary sulfur and alkali metal or alkaline earth metal alcoholates. The new products of the process are valuable starting materials for the production of dyes and pesticides.

---

This invention relates to the production of aromatic dithiocarboxylic acids by reaction of aromatic monohalomethyl compounds with elementary sulfur and alkali metal or alkaline earth metal alcoholates.

It is known that aromatic dithiocarboxylic acids can be prepared by reacting Grignard compounds with carbon disulfide (Houben-Weyl, Methoden der organischen Chemie, volume 8, page 482, and volume 9, page 747).

Phenoldithiocarboxylic acids are formed by reacting potassium or sodium phenolates with carbon disulfide (Monatshefte der Chemie, volume 9 (1888), page 296 and volume 10 (1889), page 617; Journal für praktische Chemie, volume 54 (1886), page 415). It is also known that dithiocarboxylic acids can be prepared by reacting aldehydes with dihydrogen disulfide or ammonium polysulfide (Journal für praktische Chemie, volume 82 (1910), pages 473 and 486; Journal of the American Chemical Society, volume 73 (1951), page 25). Another method of preparation is the reaction of benzotrichloride and potassium hydrogen sulfide to dithiobenzoic acid (Houben-Weyl, Methoden der organischen Chemie, volume 9, page 748).

The object of this invention is to provide a new process for the production of aromatic dithiocarboxylic acids using readily accessible starting materials by a simple method and in good yields and purity.

This and other objects of the invention are achieved and aromatic dithiocarboxylic acids are obtained advantageously by reacting a monohalomethyl compound with elementary sulfur and an alkali metal or alkaline earth metal alcoholate.

When using benzyl chloride and sodium methylate, the reaction can be represented by the following equation:

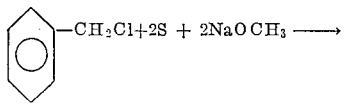
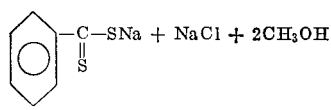

As compared with the abovementioned methods, the process according to this invention gives a large number of aromatic dithiocarboxylic acids in better yield and purity and in a simpler and more economical way using more easily accessible starting materials.

Aromatic monohalomethyl compounds are used as starting materials. They may bear one or more than one monohalomethyl group. Compounds having a plurality of halomethyl groups are converted into the corresponding polydithiocarboxylic acids. Preferred starting materials and accordingly preferred end products are those in whose general formula

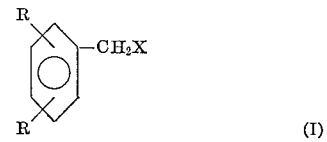

(I)

X denotes a bromine atom, iodine atom or particularly a chlorine atom, the radicals R may be identical or different and each denotes a halogen atom, a hydroxy group, an alkoxy group, particularly having up to six carbon atoms, or an alkyl, cycloalkyl, aralkyl or aryl radical, the radicals containing up to fourteen carbon atoms and, if desired, bearing the abovementioned atoms or groups as substituents. In the preferred starting materials the radicals R may also denote members of a five-membered or six-membered ring, particularly a heterocycle, which may contain a nitrogen, sulfur or oxygen atom. In the preferred starting materials one radical R or both radicals R may denote a six-membered aromatic ring which is anellated with the benzene nucleus and if desired to another six-membered aromatic ring.

Thus for example the following aromatic halomethyl compounds may be used as starting materials: p-chlorobenzyl chlorides, dichlorobenzyl chlorides, chlorobromobenzyl chlorides, diethylbenzyl chlorides, methyloctylbenzyl chloride, dicyclohexylbenzyl chlorides, chlorophenylmethylbenzyl chlorides, ethoxyphenylbenzyl chlorides, dihydroxybenzyl chlorides, iodomethoxybenzyl chlorides, dibutoxybenzyl chlorides, naphthalenemethyl chlorides, quinolinemethyl chlorides, benzopyranemethyl chlorides, indolemethyl chlorides, anthracenemethyl chlorides and the corresponding bromides and iodides.

Elementary sulfur, particularly finely divided sulfur, is used as another starting material, preferably in stoichiometric amount with reference to the halomethyl group or in excess. Alkali metal or alkaline earth metal alcoholates, particularly sodium, potassium, magnesium or calcium alcoholates, are also used as starting materials. Methylates or ethylates are generally used as alcoholates, but other alkylates, for example butylates, may also be supplied to the reaction. The alcoholates are preferably used in the stoichiometric amount with reference to the halomethyl group or in excess. Instead of the alcoholates, corresponding alcoholic solutions of alkali or alkaline earth may be supplied to the reaction.

The reaction is in general carried out at a temperature of from 20° to 200° C., preferably from 50° to 150° C., at atmospheric or superatmospheric pressure, continuously or batchwise. It is advantageous to use an organic solvent which is inert under the reaction conditions, such as aromatic hydrocarbons, for example benzene, xylene, or preferably alkanols, particularly those corresponding to the alcoholate used in the reaction, for example methanol or ethanol.

The reaction may be carried out as follows: a mixture of sulfur and an alcoholate, advantageously with a solvent, is placed in a reactor and the aromatic halomethyl compound is slowly added at the abovementioned temperature. The solvent is preferably supplied to the reaction in the form of the corresponding alkanol as the solvent medium for the alcoholate. The reaction mixture is then left at the reaction temperature for about another eight to twelve hours, cooled and filtered. The filtrate is evaporated, the residue mixed with water and the suspension thus formed is filtered. The end product can be separated from the filtrate by a conventional method, for example by acidification with mineral acid.

The compounds which can be prepared by the process according to the invention are valuable starting materials for the production of dyes and pesticides. For example 2,6-dichlorodithiobenzoic acid may be reacted with ammonia to form 2,6-dichlorothiobenzamide the use of which as a pesticide is described in U.S. patent specifications Nos. 3,318,681 and 3,338,913.

The invention is illustrated by the examples.

The parts given in the following examples are parts by weight.

EXAMPLE 1

126 parts of benzyl chloride is slowly added in the course of one hour to a mixture of 500 parts of methanol, 64 parts of sulfur and 360 parts of 30% sodium methylate solution. The reaction mixture is then heated for ten hours at 65° to 70° C., and allowed to cool. Deposited common salt is filtered off, the filtrate is concentrated and the residue mixed with water. The brown yellow aqueous solution is filtered and acidified with hydrochloric acid. Dithiobenzoic acid separates out as a thick dark red violet oil. 140 parts of dithiobenzoic acid (91% of the theory with reference to benzyl chloride used) is obtained.

For identification, a portion of the dithiobenzoic acid is converted into its lead salt with lead acetate. The lead salt obtained in amorphous form can be recrystallized from xylene and then crystallizes into lustrous carmine red needles having a melting point of 213° C.

Another portion of the dithiobenzoic acid is reacted in alcohol for three hours with cyclohexylamine at 80° C. to form N-cyclohexylthiobenzamide (melting point 90° C.).

EXAMPLE 2

196 parts of 2,6-dichlorobenzyl chloride, 64 parts of sulfur and 360 parts of 30% sodium methylate solution in 500 parts of methanol are heated for twelve hours at 65° to 70° C. Working up which is carried out as described in Example 1 gives 158 parts of 2,6-dichlorodithiobenzoic acid (equivalent to 70% of the theory with reference to 2,6-dichlorobenzyl chloride used). N-cyclohexyl-2,6-dichlorothiobenzamide (melting point 182° C.) is prepared for identification.

EXAMPLE 3

322 parts of p-chlorobenzyl chloride, 192 parts of sulfur and 1080 parts of 30% sodium methylate solution ih heated for ten hours at 70° C. Working up which is carried out as described in Example 1 gives 342 parts of p-chlorodithiobenzoic acid (equivalent to 90% of the theory). A portion is converted into N-cyclohexyl-4-chlorothiobenzamide (melting point 108° C.) for identification.

We claim:

1. A process for the production of unsubstituted and substituted dithiobenzoic acids, which comprise reacting benzyl chloride, benzyl bromide or benzyl iodide bearing 0–2 substituents on the aromatic ring, which substituents are selected from the group consisting of alkyl with up to 14 carbon atoms, cyclohexyl, a halogen atom, hydroxy, alkoxy with up to 6 carbon atoms, phenyl and chlorophenyl, with elementary sulfur and an alkali metal alcoholate or alkaline earth metal alcoholate in an inert organic solvent.

2. A process as claimed in claim 1 carried out at a temperature of from 20° to 200° C.

3. A process as claimed in claim 1 carried out at a temperature of from 50° to 150° C.

4. A process as claimed in claim 1 wherein the solvent is the alkanol corresponding to the alcoholate used in the reaction.

References Cited
UNITED STATES PATENTS 2,289,649   7/1942   Hardman _____ 260—502.6

DANIEL D. HORWITZ, Primary Examiner

U.S. Cl. X.R.

260—283 S, 345.2, 326.12 R, 551 R